April 14, 1959     A. B. RAPPAPORT     2,881,945

KITCHENWARE SAFETY HANDLE

Filed Feb. 19, 1957

INVENTOR.

Aaron B. Rappaport

BY

ATTORNEY

United States Patent Office 2,881,945
Patented Apr. 14, 1959

2,881,945

KITCHENWARE SAFETY HANDLE

Aaron B. Rappaport, New York, N.Y.

Application February 19, 1957, Serial No. 641,164

5 Claims. (Cl. 220—94)

Figure 1:
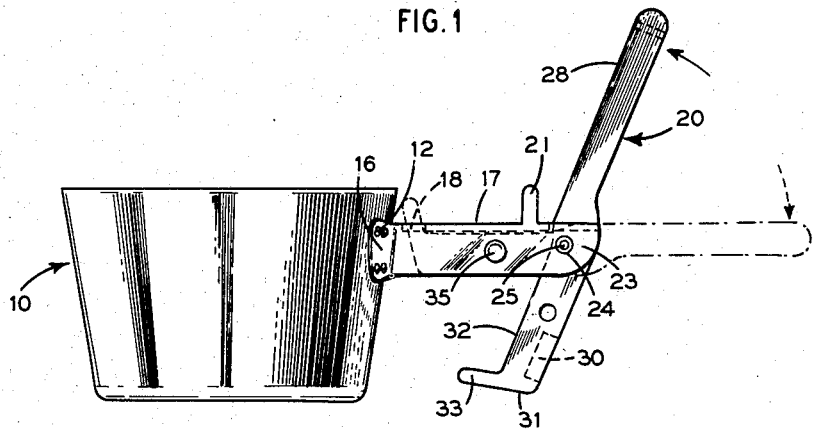
Fig. 1 is a side elevation view of a cooking utensil embodying the invention.
Figure 2:
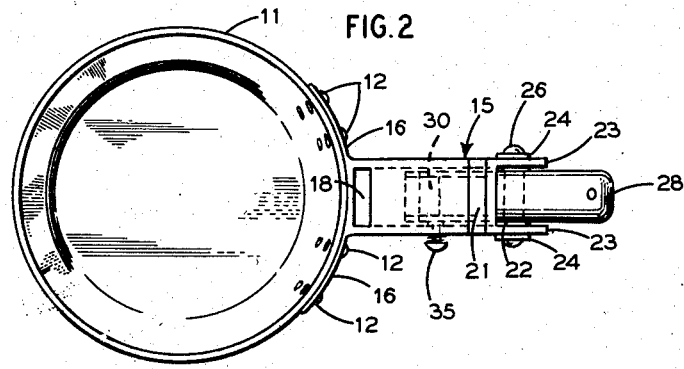
Fig. 2 is a plan view thereof.
Figure 3:
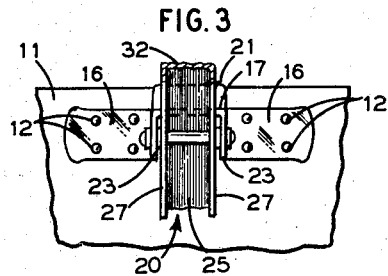
Fig. 3 is a fragmentary elevation view looking from the right of Fig. 1.

Referring to the drawing, the invention is illustrated as incorporated in a cooking utensil, such as a relatively deep sauce pan 10. However, it will be understood that the illustration of a sauce pan is exemplary only and that the safety handle is equally applicable to other cooking utensils having side walls.

In accordance with the invention, a relatively short inverted channel shape metal bracket 15 is provided with outwardly extending curved flanges 16 secured to the side wall 11 of sauce pan 10 by suitable permanent fastening means such as rivets 12. Alternatively, flanges 16 can be spot welded or brazed to side wall 11. For a purpose to be described, the top wall 17 of bracket 15 has a transverse slot 18 adjacent its inner end.

Top wall 17 is cut away at the outer end of bracket 15, and a thumb knob or bar 21 projects upwardly from wall 17 just inwardly of the cutaway portion. This cutaway portion 22 of wall 17 provides outwardly projecting flanges or tongues 23 which are apertured to receive a pin 25 on which is piovtally mounted an inverted channel shape handle 20 of such transverse dimensions as to nest freely within bracket 15. Washers 24 are provided on pin 25 beneath the heads 26 thereof and between the flanges 27 of handle 20 and tongues 23. The outer end 28 of handle 20 may be some non-heat conductive material such as wood or plastic suitably secured into the channel inner end.

Handle 20 is pivoted intermediate its ends on pin 25, and the inner end of the handle is weighted, as at 30, so that the handle is biased to the upright position. The inner end of the handle is so shaped, as at 31, as to have flat engagement with a support surface so as to act as an outrider or stabilizer to inhibit tipping of sauce pan 10.

When handle 20 is swung to the horizontal or lifting position, base or top wall 32 of the handle engages base or top wall 17 of bracket 15 and extends therealong for adequate support engagement. Tongue 33 on the inner end of the handle 20 enters slot 18 for further interfitting of the handle and bracket.

When the users hand grasps the outer end 28 of handle 20, the thumb may brace against projection 21. Also, if desired, a finger may be pressed against a spring biased pin 35 to engage the inner end of the pin in an aperture in a flange of handle 20. This locks the handle in the lift position. When handle 20 is released, it swings automatically to just beyond the position of Fig. 1.

Not shown is a variety of the above specifications, in which a hinge spring, or any other kind, is attached to both the cooking vessel and the handle, serving to raise the handle to a vertical position.

What I claim is:

1. In combination with a cooking utensil having a side wall, a safety handle construction comprising a bracket secured to said side wall to project substantially horizontally therefrom; a pin extending transversely of the outer end of said bracket; and a relatively elongated handle pivoted intermediate its ends on said pin for swinging movement in a vertical plane between an upright position and a horizontal utensil-lifting position, the portion of said handle inwardly of said pin extending along and underlying said bracket when said handle is swung to the horizontal utensil-lifting position; and the portion of said handle inwardly of said pin being heavier than the portion outwardly of said pin whereby the handle is biased to swing to the upright position; the length of said handle inwardly of said pin being such that, in the upright position of the handle, the inner end thereof engages the support surface for the utensil.

2. In combination with a cooking utensil having a side wall, a safety handle construction comprising an inverted channel shape bracket permanently secured to said side wall to project substantially horizontally therefrom, the channel base being cut away adjacent its outer end; a pin extending between the channel flanges at such outer end; and a relatively elongated handle pivoted intermediate its ends on said pin for swinging movement in a vertical plane between an upright position and a horizontal utensil-lifting position, at least that portion of the handle inwardly of said pin having an inverted channel shape and nesting within and along said bracket in the horizontal utensil-lifting position of said handle; the portion of said handle inwardly of said pin being heavier than the portion outwardly of said pin whereby the handle is biased to swing to an upright position; the length of said handle inwardly of said pin being such that, in the upright position of the handle, the inner end thereof engages the support surface for the utensil.

3. The combination claimed in claim 2 including a tongue projecting from the inner end of said handle and engageable in a slot in the inner end of said bracket in the utensil-lifting position of said handle.

4. The combination claimed in claim 3 including a thumb piece on said bracket inwardly of said pin.

5. The combination claimed in claim 4 including a latch pin carried by said handle and releasably engageable in said bracket to lock said handle in the utensil-lifting position.

References Cited in the file of this patent

UNITED STATES PATENTS

| | | |
|---|---|---|
| 403,656 | Gerstle | May 21, 1889 |
| 690,828 | Brown | Jan. 7, 1902 |
| 1,522,329 | Salucci | Jan. 6, 1925 |
| 2,004,542 | Wagner | June 11, 1935 |
| 2,370,860 | Hanke | Mar. 6, 1945 |